US006979042B2

(12) United States Patent
Kawasaki

(10) Patent No.: US 6,979,042 B2
(45) Date of Patent: Dec. 27, 2005

(54) AUTOMOTIVE SUN VISOR DEVICE

(75) Inventor: Teruo Kawasaki, Kanagawa (JP)

(73) Assignee: Kasai Kogyo Co., Ltd., Koza-gun (JP)

( * ) Notice: Subject to any disclaimer, the term of this patent is extended or adjusted under 35 U.S.C. 154(b) by 147 days.

(21) Appl. No.: 10/726,001

(22) Filed: Nov. 13, 2003

(65) Prior Publication Data

US 2004/0155489 A1 Aug. 12, 2004

(30) Foreign Application Priority Data

Nov. 25, 2002 (JP) .......................... 2002-341387

(51) Int. Cl.[7] .................................. B60J 3/02

(52) U.S. Cl. .................. 296/97.8; 296/211; 296/215

(58) Field of Search ............... 296/97.8, 97.1, 296/97.9, 97.11, 211, 215

(56) References Cited

FOREIGN PATENT DOCUMENTS

JP          8-192693 A     7/1996
JP       2001-130339 A     5/2001

*Primary Examiner*—Joseph D Pape
(74) *Attorney, Agent, or Firm*—Foley & Lardner LLP

(57) ABSTRACT

There is provided an automotive sun visor device in which an opening 2b of a sunroof 4 is formed in a front portion of a roof panel 2 constituting the upper part of a vehicle body 1, a slide member 17c slidable in the longitudinal direction is provided on the cabin inside of the sunroof 4 in which the opening 2b is covered by an extending portion 5a of a windshield glass 5, and a sun visor body 16 for blocking bright sunlight coming from the front is installed to the slide member 17c so as to be turnable in the up-and-down direction. When the sun visor body 16 is not in use, the sun visor body 16 is moved to the rear of the sunroof 4, by which the sunroof 4 is not closed by the sun visor body 16. Therefore, a large open space can be obtained in front of the head of passenger, especially, on the front seat, and thereby the comfort in the cabin is enhanced significantly.

10 Claims, 6 Drawing Sheets

AUTOMOTIVE SUN VISOR DEVICE

CROSS-REFERENCES TO RELATED APPLICATION

This application claims all benefits accruing under 35 U.S.C 119 from the Japanese Patent Application No. 2002-341387, filed Nov. 25, 2002.

BACKGROUND OF THE INVENTION

1. Field of the Invention

The present invention relates to a sun visor device for an automobile provided with a sunroof in a front portion of a ceiling of a vehicle body.

2. Description of the Related Art

Conventionally, an automobile has been provided with sun visors for blocking bright sunlight coming from the front at positions near a ceiling in front of a driver seat and a passenger seat.

This sun visor is constructed to be stored along a roof trim covering a ceiling surface so that the sun visor does not cause a hindrance when it is not in use.

Also, some conventional automobiles are provided with an opening called a sunroof in a ceiling portion of vehicle body to enhance comfort in a cabin by introducing much outside light into the cabin (for example, Patent Document 1 (Unexamined Japanese Patent Publication No. 8-192693) and Patent Document 2 (Unexamined Japanese Patent Publication No. 2001-130339)).

The sunroof described in the aforementioned Patent Document 1 is configured so that, as shown in FIG. 5, a sunroof glass is provided in a sunroof (lighting window) a which is open in a ceiling portion and a sunshade trim b is mounted so as to be slidable to the inside of the sun glass, and a room lamp c is provided near the front end in the slide direction of the sunshade trim b. In this configuration, a sun visor d is stored between the front end of a roof trim e and the sunroof a.

Also, the sunroof described in the aforementioned Patent Document 2 is configured so that a particular portion of lighting device assembled under the ceiling of vehicle body is fitted in an opening to be located under the formed ceiling, and the opening of formed ceiling is fitted in a concave portion formed around the particular portion of lighting device to conceal the edge portion of the opening. In this configuration, as the same as described in Patent Document 1, the sun visor is stored between the front end of the roof trim and the sunroof.

However, in the sunroof described in the aforementioned Patent Document 1 or 2, since the opening is provided in a part of the indoor ceiling, there arises a problem of lack of a sense of spaciousness.

To overcome such a problem, in recent years, an automobile in which a sense of spaciousness in the cabin is enhanced by providing the sunroof a in a front end portion of the roof trim e as shown in FIG. 6 has been thought.

The automobile in which the sunroof a is provided in a front end portion of the roof trim e is configured so that an opening f is provided in a front portion of ceiling of vehicle body, and a part of a windshield glass g or a separate auxiliary glass extends to the opening f to cover the opening f. This configuration has an effect that a sense of spaciousness, especially, of the front seat in the cabin is further enhanced because the windshield glass g and the sunroof a are integrated with each other.

However, for the sunroof a in which the opening f is provided in a front portion of ceiling and the opening f is covered by a part of the windshield glass g, a strength member for attaching the sun visor d does not exist, which poses a problem in that the sun visor d cannot be installed.

Also, in the case where a strength member for attaching the sun visor d is provided, for example, near the front end of ceiling and the sun visor d is installed to this strength member, if the sun visor d is stored along the inside of the sunroof a when it is not in use, there arises a problem in that the sunroof a is closed by the sun visor d, whereby a sense of spaciousness is not satisfied.

Further, in the case where it is attempted to use the sun visor d also as a sunshade, if the size of the sun visor d is not almost the same as the opening area of the sunroof a, a gap is produced, so that the function as the sunshade is impaired. Also, when the size of the sun visor d is made almost the same as the opening area of the sunroof a, the sun visor d is too large, so that there is caused a problem of impaired operability and storing property of the sun visor d.

The present invention has been made to solve the above-mentioned problems, and, accordingly, an object thereof is to provide an automotive sun visor device which does not take away a sense of spaciousness of sunroof.

BRIEF SUMMARY OF THE INVENTION

To achieve the above object, the present invention provides an automotive sun visor device in which an opening of a sunroof is formed in a front portion of a roof panel constituting the upper part of a vehicle body, and the opening is covered by an extending portion of a windshield glass or a separate auxiliary glass, wherein a slide member slidable in the longitudinal direction is provided on the cabin inside of the sunroof, and a sun visor body for blocking bright sunlight coming from the front is installed to the slide member to be turnable in the up-and-down direction.

By the above-described configuration, when the sun visor body is not in use, the sun visor body is moved to the rear of the sunroof so that the sunroof is not closed by the sun visor body. Therefore, a large open space can be obtained in front of the head of passenger, especially, on the front seat, and thereby the comfort in the cabin is enhanced significantly. Also, since a strength member for installing the sun visor at the boundary between the windshield glass and the sunroof need not be provided, a sense of spaciousness of the sunroof is not taken away by the strength member.

To achieve the above object, in the automotive sun visor device in accordance with the present invention, a sun visor storage portion for storing the sun visor body is provided at the rear of the sunroof.

By the above-described configuration, when the sun visor is not in use, the sun visor is moved to the rear of the sunroof together with the slide member and is stored in the sun visor storage portion. Therefore, the sun visor does not cause a hindrance, and the appearance becomes quite neat.

To achieve the above object, in the automotive sun visor device in accordance with the present invention, a sunshade slidable in the longitudinal direction is provided on the cabin inside of the sunroof, and the slide member is provided in a front portion of the sunshade.

By the above-described configuration, the sunroof is covered by the sunshade so that the sunlight coming from the upside can be blocked, and also the sunroof can be covered without increasing the size of the sun visor, so that the operability and storing property of the sun visor are not impaired.

DETAILED DESCRIPTION OF THE EXEMPLARY EMBODIMENTS

An embodiment of the present invention will be described in detail with reference to the accompanying drawings.

Figure 1:
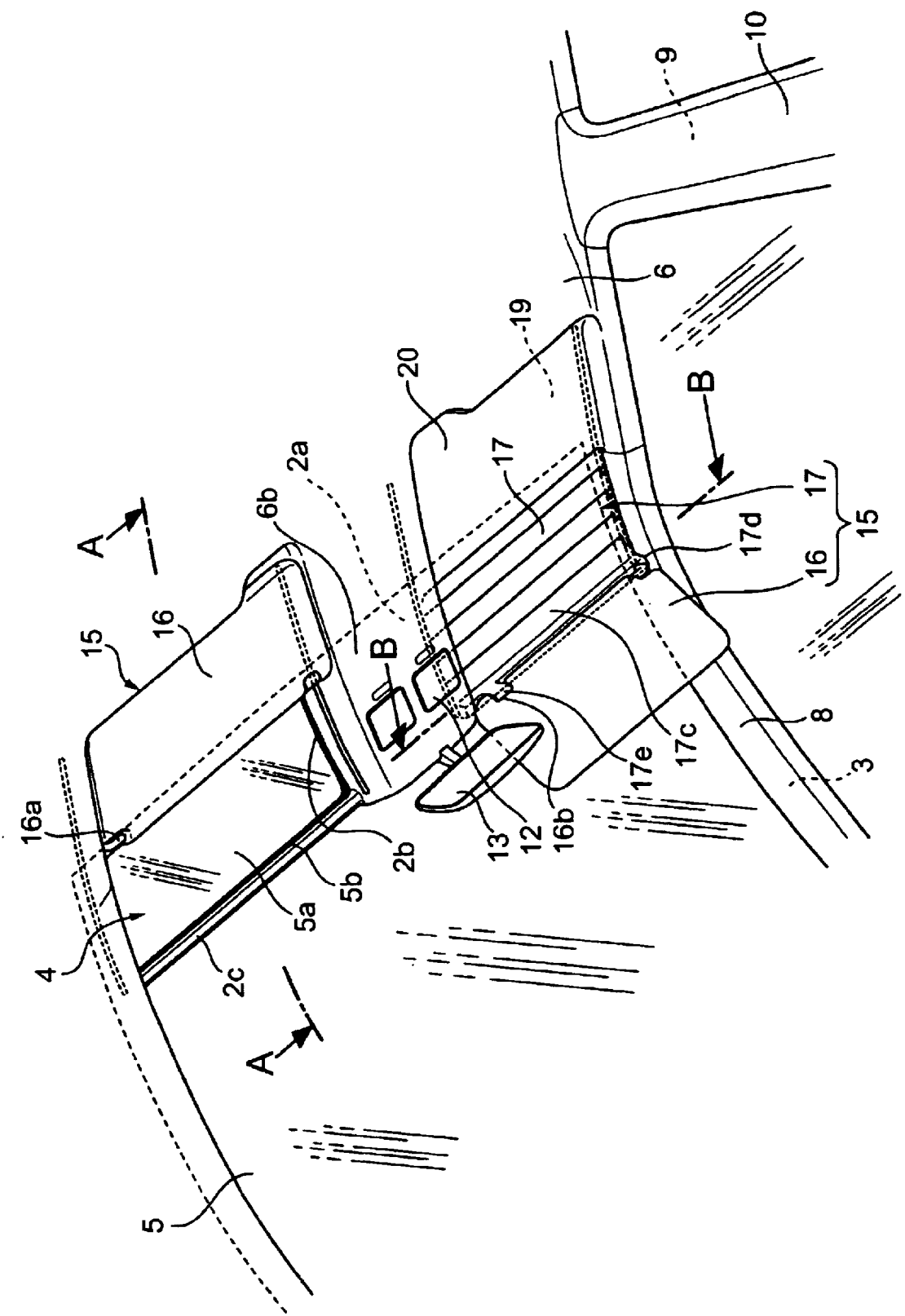
FIG. 1 is a perspective view of an automotive sun visor device in accordance with an embodiment of the present invention, viewed from the cabin side.
Figure 2:
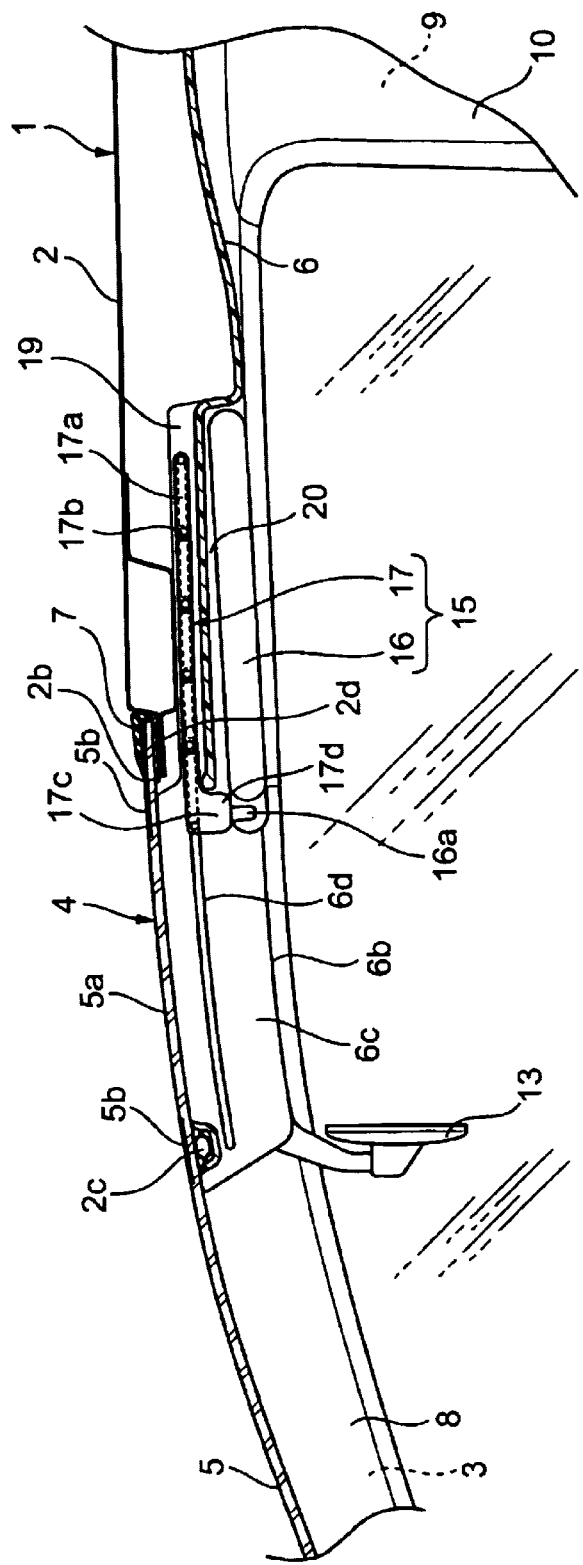
FIG. 2 is a sectional view taken along the line A—A of FIG. 1.
Figure 3:
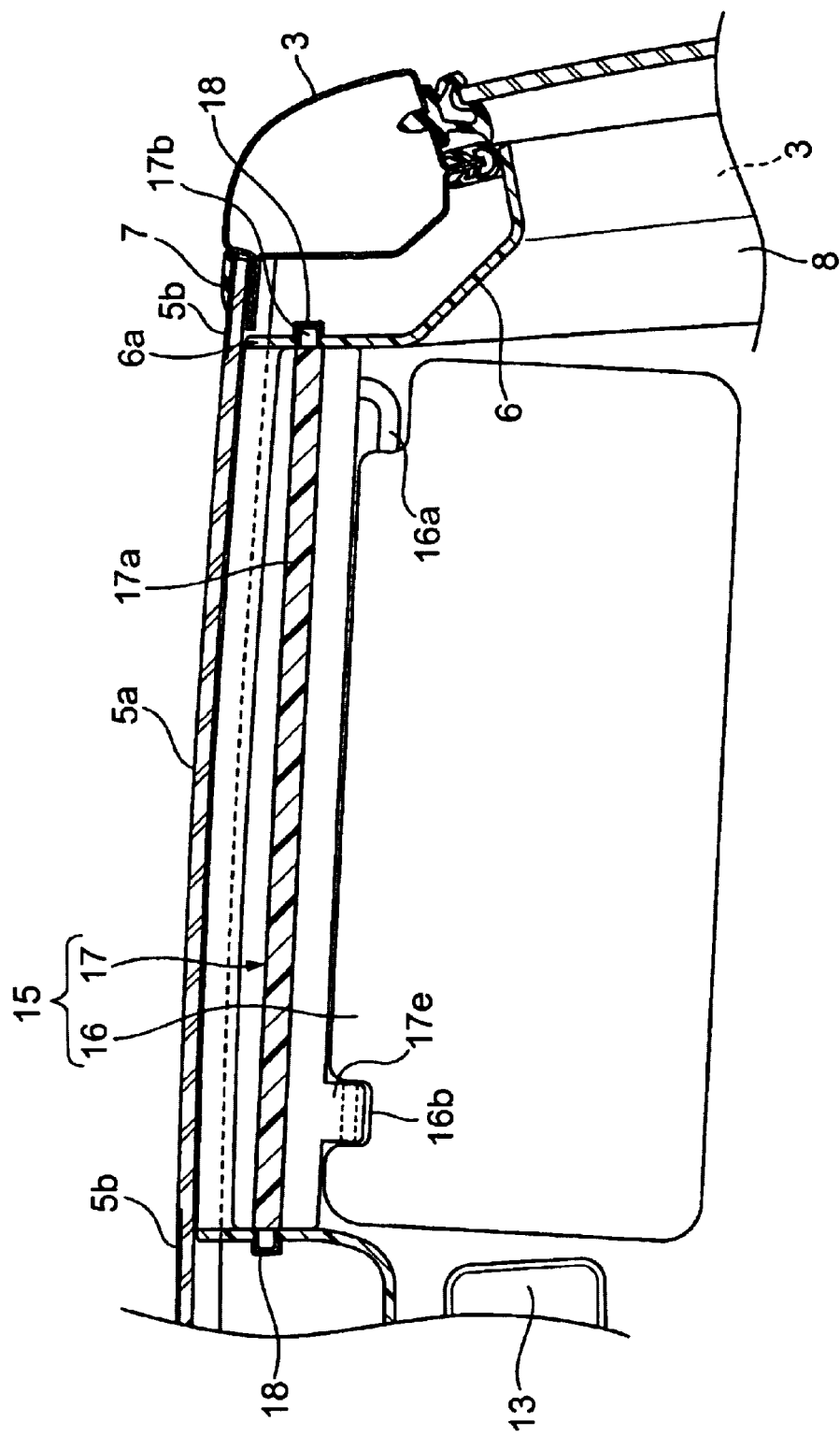
FIG. 3 is a sectional view taken along the line B—B of FIG. 1.
Figure 4:
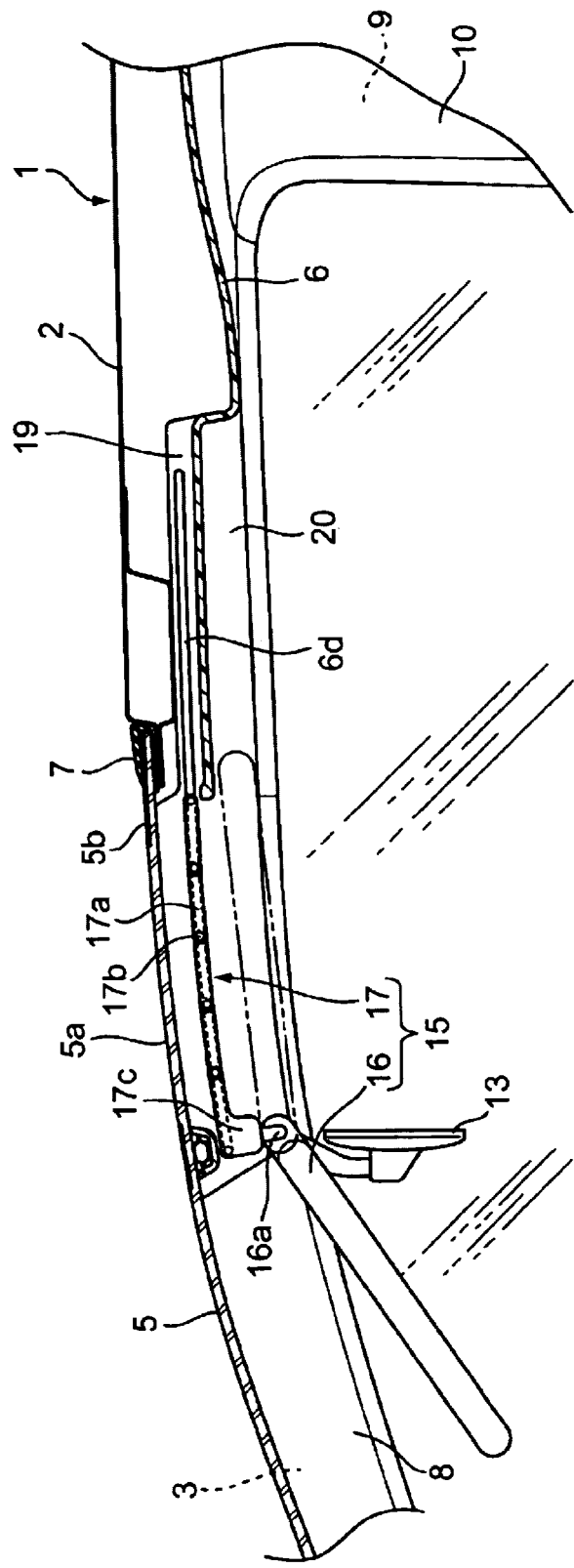
FIG. 4 is an explanatory view of the operation of an automotive sun visor device in accordance with an embodiment of the present invention.
Figure 5:
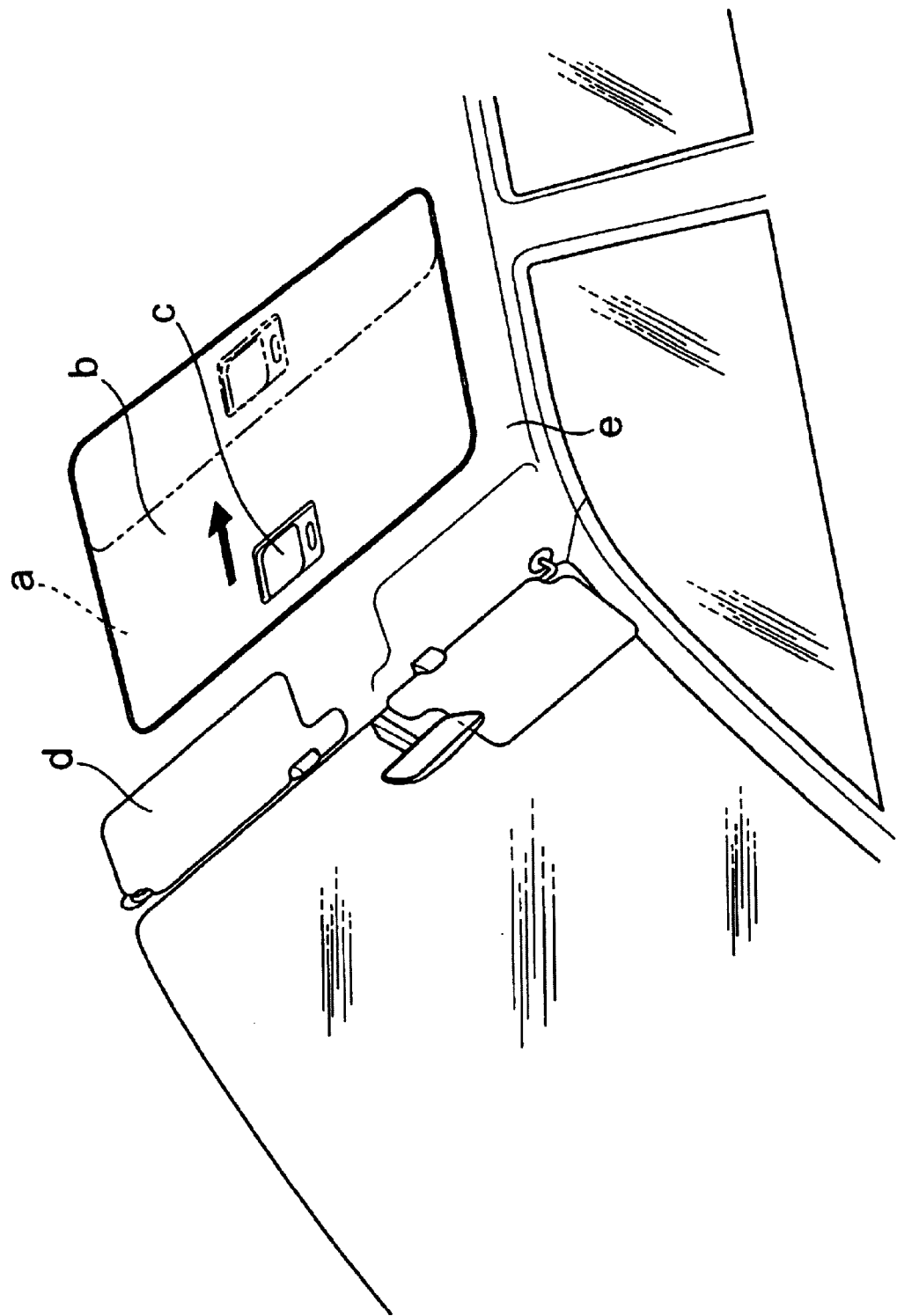
FIG. 5 is a perspective view of a conventional sun visor and sunroof, viewed from the cabin side.
Figure 6:
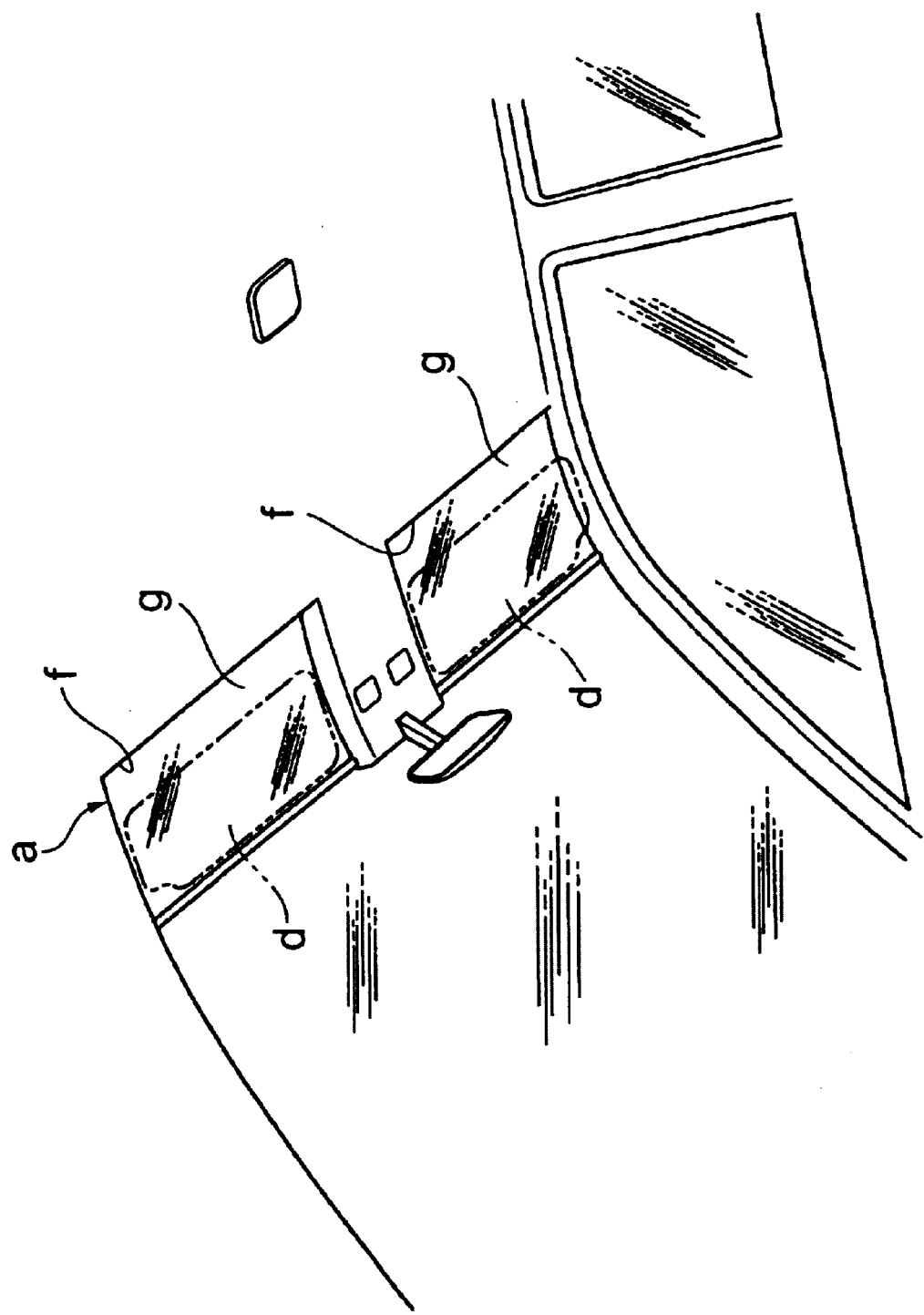
FIG. 6 is a perspective view of a conventional sunroof, viewed from the cabin side.

FIG. 1 is a perspective view of a sun visor device viewed from the cabin side, FIG. 2 is a sectional view taken along the line A—A of FIG. 1, FIG. 3 is a sectional view taken along the line B—B of FIG. 1, and FIG. 4 is an explanatory view of the operation of the sun visor device.

An upper portion of a vehicle body 1 of an automobile shown in FIG. 1 is constructed by a roof panel 2 and front pillars 3 extending on both sides in a front end portion of the roof panel 2, and a sunroof 4 is provided in a front end portion of the roof panel 2.

The sunroof 4 is configured so that openings 2b are formed at opposed positions on the opposite side of an extending portion 2a in the front center of the roof panel 2 by cutting both sides of the roof panel 2 excluding the extending portion 2a, and an upper extending portions of a windshield glass 5 fitted between the front pillars 3 or separate auxiliary glasses 5a cover the openings 2b from the upside as shown in FIGS. 2 and 3.

The auxiliary glass 5a covering the opening 2b is formed with a black frame-like colored portion 5b by means such as printing so that an edge 6a of a roof trim 6 covering the cabin inside surface of the roof panel 2 and a front pillar 2c transversely mounted at the front end of the opening 2b are invisible from the outside of the vehicle.

The front pillar 2c, which is provided to reinforce the roof panel 2 whose stiffness is decreased by cutting the front portion and to support the upper part of the windshield glass 5, is formed by a slender rod-shaped member to prevent a sense of speciousness from being hindered. The front pillar 2c is integrally formed when the roof panel 2 is formed, and a seal member 7 for preventing the intrusion of rain water etc. is interposed between a peripheral edge portion of the extending portion 5a of the windshield glass 5 and a flange portion (not shown) of the front pillar 3 or a flange portion 2d of the roof panel 2 as shown in FIG. 2.

The roof trim 6 covering the cabin inside surface of the roof panel is mounted on the inside of the roof panel 2 so as to cover almost the whole surface excluding the sunroofs 4. The inside of the front pillar 3 is covered by a front pillar garnish 8, and the inside of the center pillar 9 is covered by a center pillar garnish 10, so that the roof panel 2, the front pillar 3, the center pillar 9, and the like are not exposed to the cabin side.

Room lamps 12 are embedded in an extending portion 6b of the roof trim 6 covering the inside of the extending portion 2a projectingly provided in the front center of the roof panel 2, and an inside rear view mirror 13 is installed in a front end portion of the extended portion 2a.

On the other hand, sun visor units 15 are mounted on the cabin inside of the sunroof 4.

The sun visor unit 15 consists of a sun visor body 16 for blocking bright sunlight coming from the front or side and a sunshade 17 for blocking sunlight coming through the sunroof 4.

The sunshade 17 consists of a plurality of shading plates 17a connected by shaft rods 17b, each shading plate 17a being bendable around the shaft rod 17b, and is formed so as to have a size large enough to cover almost the whole of the sunroof 4.

Both sides of each shaft rod 17b project from both end portions of the shading plate 17a, and are inserted slidably in slide rails 18 provided on the inside of a side wall portion 6c of the roof trim 6 covering both sides of the sunroof 4.

The slide rail 18 is provided along the inside of an elongated groove 6d, which is long in the longitudinal direction, formed in the side wall portion 6c of the roof trim 6 to guide the shaft rods 17b moving longitudinally along with the opening/closing of the sunshade 17. Also, a slide member 17c forming a front end portion of the sunshade 17 is formed with a bracket 17d and a holder 17e, and one end side of a support rod 16a for supporting the sun visor body 16 is installed to the bracket 17d so as to be turnable.

The support rod 16a is formed by a metal rod whose one end side is bent substantially into an L-shape, and the upper side of the sun visor body 16 is installed to this support rod 16a so as to be turnable.

The sun visor body 16 is formed by a flat plate body having a width narrower than the width of the sunroof 4. The surface of the sun visor body 16 is covered with a skin formed of a soft resin sheet, and the sun visor body 16 is formed with a notch 16b located at a position coinciding with the holder 17e provided on the slide member 17c.

A part of the support rod 16a exposed by this notch 16b is fitted in the holder 17e so that the sun visor body 16 can be held at a horizontal position. Also, a sunshade storage portion 19 is formed between the roof panel 2 at the rear of the sunroof 4 and the roof trim 6, and a sun visor storage portion 20 is formed under the sunshade storage portion 19 by recessing the roof trim 6 to the side of roof panel 2.

Although not shown, locking means for locking the slide member 17c provided at the front end of the sunshade 17 at the forward motion end, an intermediate point, and the rearward motion end are provided, for example, at three places of front and rear ends of the slide rail 18 and an intermediate portion. When the sunshade 17 can be held at a desired opening/closing position by the sliding resistance of the sunshade 17, the locking means may be omitted.

Next, the operation of the sun visor device constructed as described above will be explained.

FIG. 1 shows a case where the sun visor body 16 on the driver seat side is in a used state. The sun visor body 16, which has been moved to the front end of the sunroof 4 together with the sunshade 17, is turned to the front around the support rod 16a so that bright sunlight coming from the front can be blocked. At this time, the sunroof 4 is covered by the sunshade 17. However, since the period of time in a day when the bright sunlight comes from the front is often in the morning or in the evening, less sunlight comes from the upside, so that no hindrance is caused even if the sunroof 4 is covered by the sunshade 17.

When it is desired to block only sunlight coming from the upside, the sun visor body 16 is stored along the inside of the sunshade 17 as indicated by an imaginary line in FIG. 4 in a state in which the sunshade is moved to the front, by which sunlight coming from the upside can be blocked by the sunshade 17, and also the sunroof 4 can be opened to an arbitrary range by adjusting the opening position of the sunshade 17.

On the other hand, when both of the sun visor body 16 and the sunshade 17 become unnecessary, the sunshade 17 is moved rearward in a state in which the sun visor body 16 is stored at the position indicated by the imaginary line in FIG. 4, by which the sunshade 17 is stored in the sunshade storage portion 19 and the sun visor body 16 is stored in the sun visor storage portion 20 as shown in FIG. 2.

Thereby, the sunroof 4 is fully opened, so that a sense of spaciousness, especially, of the front seat is enhanced. Also, since both of the sun visor body 16 and the sunshade 17 are stored in the storage portions 20 and 19, respectively, no hindrance is caused, and the appearance becomes quite neat.

The slide member 17c etc. may be fitted with a handle to facilitate the movement of the sun visor body 16 and the sunshade 17.

In the above-described embodiment, the sunshade 17 and the slide member 17c are constructed separately. On the other hand, these elements may be integrally constructed. Also, only the slide member 17c is provided so as to be slidable in the longitudinal direction, and the sun visor body 16 is installed to this slide member 17c, by which the sunshade 17 can be omitted.

In the present invention configured as described above, as is described in detail, the slide member slidable in the longitudinal direction is provided on the cabin inside of the sunroof, and the sun visor body for blocking bright sunlight coming from the front is installed to the slide member so as to be turnable in the up-and-down direction. Therefore, when the sun visor is not in use, the sun visor is moved to the rear of the sunroof, by which the sunroof is not closed by the sun visor. As a result, a large open space can be obtained in front of the head of passenger, especially, on the front seat. Thereby, the comfort in the cabin is enhanced significantly. Also, since it is not necessary to provide a strength member for installing the sun visor at the boundary between the windshield glass and the sunroof, a sense of spaciousness of the sunroof is not taken away by the strength member.

Also, since the sun visor storage portion for storing the sun visor body is provided at the rear of the sunroof, when the sun visor is not in use, the sun visor is moved to the rear of the sunroof together with the slide member and is stored in the sun visor storage portion. Therefore, no hindrance is caused, and the appearance becomes quite neat.

Further, since the sunshade slidable in the longitudinal direction is provided on the cabin inside of the sunroof and the slide member is provided in a front portion of the sunshade, the sunroof is covered by the sunshade. Therefore, sunlight coming from the upside can be blocked, and also the sunroof can be covered without increasing the size of the sun visor, so that the operability and storing property of the sun visor are not impaired.

What is claimed is:

1. An automotive sun visor device for a sunroof which is in a front portion of a roof panel and which is closed by an extending portion of a windshield glass or a separate auxiliary glass, comprising:
   a sunshade member slidable in and out of a concealed space between the roof panel and a roof trim disposed between the roof panel and a vehicle cabin, and
   a sun visor body pivotally mounted at a front end of the sunshade member, the sun visor body being constantly exposed to the vehicle cabin and storable by being folded back into a sun visor storage portion indented into a cabin exposed surface of the roof trim.

2. The automotive sun visor device according to claim 1, wherein the sun visor storage portion for storing said sun visor body is provided rearwardly of said sunroof.

3. The automotive sun visor device according to claim 1, wherein the sunshade is slidable in a longitudinal direction of the vehicle.

4. The automotive sun visor device according to claim 1, wherein the sunvisor body is configured to be pivotal even when the sunshade member is fully received in the concealed space.

5. The automotive sun visor device according to claim 1, wherein the sunshade member comprises a plurality of pivotally interconnected shading plates.

6. An automotive sun visor arrangement for a vehicle having a windshield and two sunroofs which extend in a side-by-side relationship rearwardly of the windshield and which are separated by a center extension that extends forward toward the windshield and which is covered by a roof trim, each sun visor arrangement comprising:
   a sunshade member which is slidable in and out of a concealed space between a roof panel and the roof trim disposed between the roof panel and a vehicle cabin, and
   a sun visor body which is pivotally mounted at a front end of the sunshade member, the sun visor body being configured to be constantly exposed to the vehicle cabin even when folded back into a sun visor storage portion indented into the roof trim.

7. The automotive sun visor device according to claim 6, wherein each sunvisor body is configured to be pivotal even when the corresponding sunshade member is fully received in the concealed space.

8. The automotive sun visor arrangement as set forth in claim 6, wherein the sun visor arrangement is arranged in connection with transversely extending members which interconnect the center extension with front pillars of the vehicle in a manner which supports a leading end of the center extension, the transversely mounted members each being located proximate a forward limit to which a slide member is slidable and are each configured to be invisible from outside of the vehicle.

9. The automotive sun visor device according to claim 8, wherein the leading end of the sunshade member is in part slidably supported by the center extension as it slides from a partially concealed position to a fully deployed position.

10. An automotive sun visor device for a vehicle having an opening for a sunroof formed at approximately a center portion of a roof panel of a vehicle body having an interior cabin, and an opening for an auxiliary sunroof formed, by opening both sides of said roof panel excluding a front-center extending portion, at opposite positions, with said front-center extending portion between them, roof trim covering the inner surface on the cabin side of said roof panel, and said opening for the auxiliary sunroof is covered with an extending portion of a front windshield or a separate auxiliary glass,
   wherein, for each side of the auxiliary sunroof, a sunshade member, slidable in the longitudinal direction, is disposed to be slidable in and out of a recess concealed between the roof trim and the roof panel,
   a sun visor body for blocking bright sunlight pivotally supported on the sunshade member,
   and a sun visor storage portion for enabling storage of said sun visor body, comprising a concavely indented portion of said roof trim on the cabin-facing side thereof.

* * * * *